United States Patent
Harang et al.

(10) Patent No.: US 10,291,633 B1
(45) Date of Patent: May 14, 2019

(54) BANDWIDTH CONSERVING SIGNATURE DEPLOYMENT WITH SIGNATURE SET AND NETWORK SECURITY

(71) Applicant: U.S. Army Research Laboratory ATTN: RDRL-LOC-I, Adelphi, MD (US)

(72) Inventors: Richard E Harang, Alexandria, VA (US); Lisa M Marvel, Churchville, MD (US); Travis W Parker, Abingdon, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 161 days.

(21) Appl. No.: 15/330,591

(22) Filed: Oct. 18, 2016

(51) Int. Cl.
 *H04L 29/06* (2006.01)
 *H04L 29/08* (2006.01)
 *H04W 84/18* (2009.01)

(52) U.S. Cl.
 CPC ........ *H04L 63/1416* (2013.01); *H04L 63/101* (2013.01); *H04L 63/1441* (2013.01); *H04L 67/10* (2013.01); *H04W 84/18* (2013.01)

(58) Field of Classification Search
 CPC ............ H04L 63/1416; H04L 63/1433; H04L 63/145; H04L 63/18; H04L 63/20; H04L 63/1408; H04L 63/1441; H04L 63/1458; H04L 29/06877; H04L 29/06884; H04L 29/06904; G06F 21/56
 See application file for complete search history.

(56) References Cited

U.S. PATENT DOCUMENTS

| 7,181,506 B1 * | 2/2007 | Vigue ................... H04L 63/145 709/205 |
| 7,444,515 B2 | 10/2008 | Dharmapurikar et al. |
| 8,191,147 B1 * | 5/2012 | Gardner ................ G06F 21/564 726/24 |

(Continued)

OTHER PUBLICATIONS

Sasu Tarkoma, Christian Esteve Rothenberg, and Eemil Lagerspetz, "Theory and Practice of Bloom Filters for Distributed System" IEEE Communications Surverys & Tutorials, vol. 14, No. 1, p. 1, Sec. II Bloom Filters, para. 1, $1^{st}$ Quarter 2012.*

(Continued)

*Primary Examiner* — Ali S Abyaneh
(74) *Attorney, Agent, or Firm* — Lawrence E. Anderson; Eric Brett Compton

(57) ABSTRACT

A malware detection system comprising a signature generator for combining malware signatures into a malware signature filter with a fixed false positive rate; a central location configured to send the malware signature filter to each of a plurality of hosts that are configured to scan files on the host system using the malware signature filter; each host configured such that if the scan indicates a positive result, the file is quarantined and the host sends identification back to central location if a false positive result is obtained for additional instruction. A method for malware detection operative to combine malware signatures into a filter with fixed false positive rate; comprising sending a malware signature filter to hosts for scanning of files on the host system and incoming data; if the malware signature filter returns a positive alert, identification is sent back to a central location.

19 Claims, 8 Drawing Sheets

(56) References Cited

U.S. PATENT DOCUMENTS

| | | | |
|---|---|---|---|
| 8,286,239 B1* | 10/2012 | Sutton | H04L 63/0227 726/22 |
| 8,306,988 B1 | 11/2012 | Jyoti | |
| 8,375,450 B1* | 2/2013 | Oliver | G06F 21/564 726/24 |
| 8,464,335 B1* | 6/2013 | Sinha | G06F 21/51 713/153 |
| 8,918,877 B1 | 12/2014 | Xie | |
| 9,258,118 B1* | 2/2016 | Roth | H04L 9/0863 |
| 2002/0138760 A1* | 9/2002 | Naitoh | G06F 21/56 726/24 |
| 2008/0229103 A1* | 9/2008 | Mutka | H04L 63/0876 713/168 |
| 2009/0293125 A1 | 11/2009 | Szor | |
| 2010/0281541 A1 | 11/2010 | Stolfo | |
| 2017/0279838 A1* | 9/2017 | Dasgupta | H04L 63/1425 |

OTHER PUBLICATIONS

A. Broder and M. Mitzenmacher, "Network applications of bloom filters: A survey," Internet mathematics, vol. 1, No. 4, pp. 485-509, 2004.

K. Wang, J. J. Parekh and S. J. Stolfo, "Anagram: A content anomaly detector resistant to mimicry attack," in Recent Advances in Intrusion Detection, Heidelberg, 2006.

S. Dharmapurikar, H. Song, J. Turner and J. Lockwood, "Fast Packet Classification Using Bloom Filters," Washington University in St. Louis, 2006.

H. Song, S. Dharmapurikar, J. Turner and J. Lockwood, "Fast hash table lookup using extended bloom filter: an aid to network processing," ACM SIGCOMM Computer Communication Review, vol. 35, No. 4, pp. 181-192, 2005.

S. Dharmapurikar, P. Krishnamurthy, T. Sproull and J. Lockwood, "Deep packet inspection using parallel bloom filters," in 11th Symposium on High Performance Interconnects, 2003.

K. Shanmugasundaram, H. Brönnimann and N. Memon, "Payload attribution via hierarchical bloom filters," in Proceedings of the 11th ACM conference on Computer and communications security, 2004.

E. H. Spafford, "Opus: Preventing weak password choices," Purdue University Purdue e-Pubs, https://pdfs.semanticscholar.org/ce61/eef0efd3544c8df43324cbe4e05ba12a610a.pdf; also published in Computers & Security, vol. 11, No. 3, pp. 273-288, 1992.

P. S. Almeida, C. Baquero, N. Preguiça and D. Hutchison, "Scalable bloom filters," Information Processing Letters, vol. 101, No. 6, pp. 255-261, 2007.

M. Mitzenmacher, "Compressed bloom filters," IEEE/ACM Transactions on Networking, vol. 10, No. 5, pp. 604-612, 2002.

R. Chang, R. E. Harang and G. S. Payer, "Extremely Lightweight Intrusion Detection (ELIDe)," Army Research Laboratory, 2013.

D. Zhang, L. Ge, R. Hardy, H. Zhang, W. Yu and R. Reschly, "On Effective Data Aggregation Techniques in Host-based Intrusion Detection in MANET," in Proc. 10th Annual IEEE Consumer Communications and Networking, 2013.

P. Mell and R. Harang, "Lightweight Packing of Log Files for Improves Compression in Mobile Tactical Networks," in IEEE Conference on Military Communications (MILCOM), 2014.

B. H. Bloom, "Space/time trade-offs in hash coding with allowable errors," Communications of the ACM, vol. 13, No. 7, pp. 422-426, 1970.

Offerman, D.C, et al. "On a Class of Rearrangeable Switching Networks Part I: Control Algorithm," American Telephone and Telegraph Company Te& Bell Sv1n1o1 Technical Jouanal vol. 5O, No. 5, May-Jun. 1971.

* cited by examiner

FIG. 3 — Verification of positive results from Bloom filters

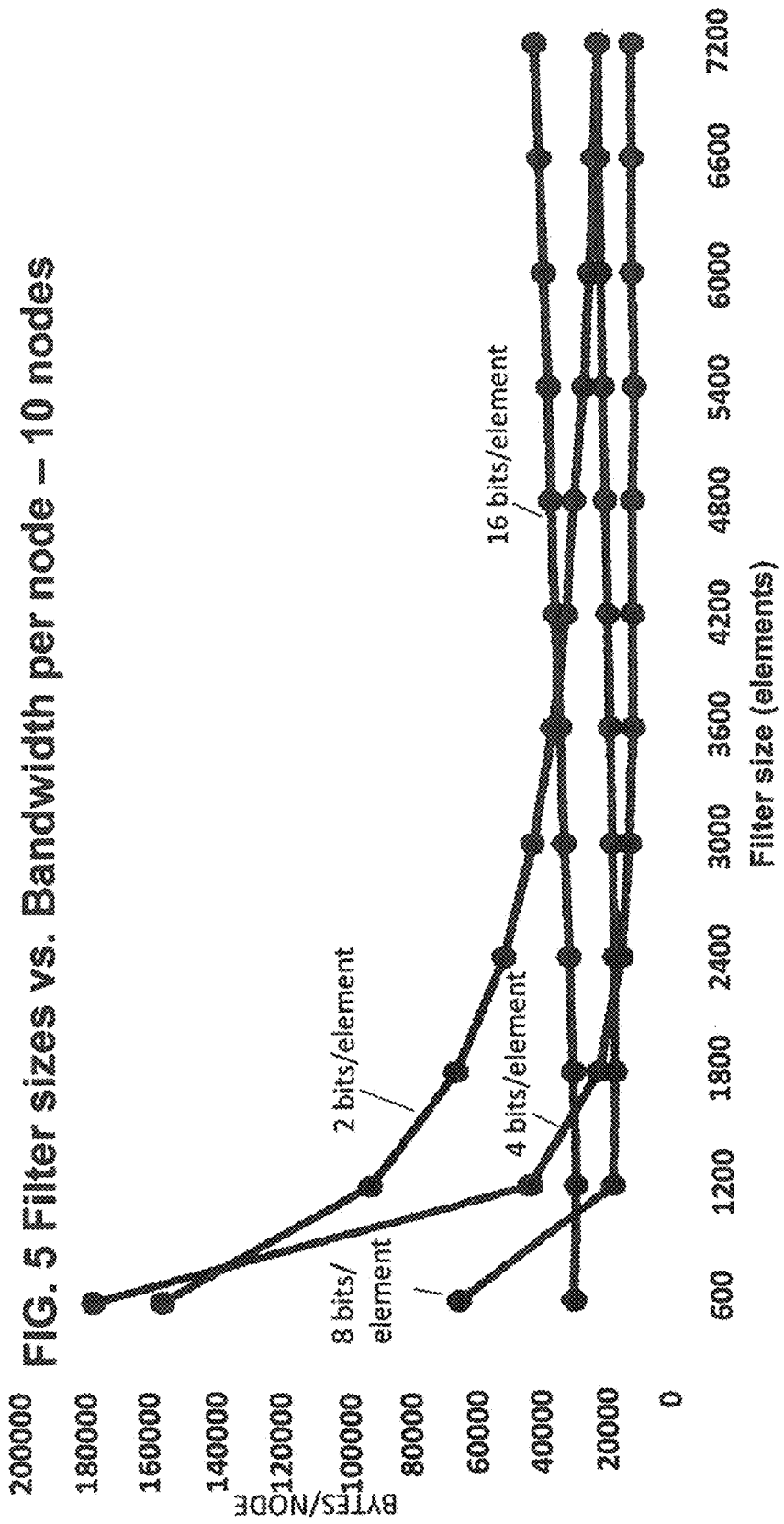

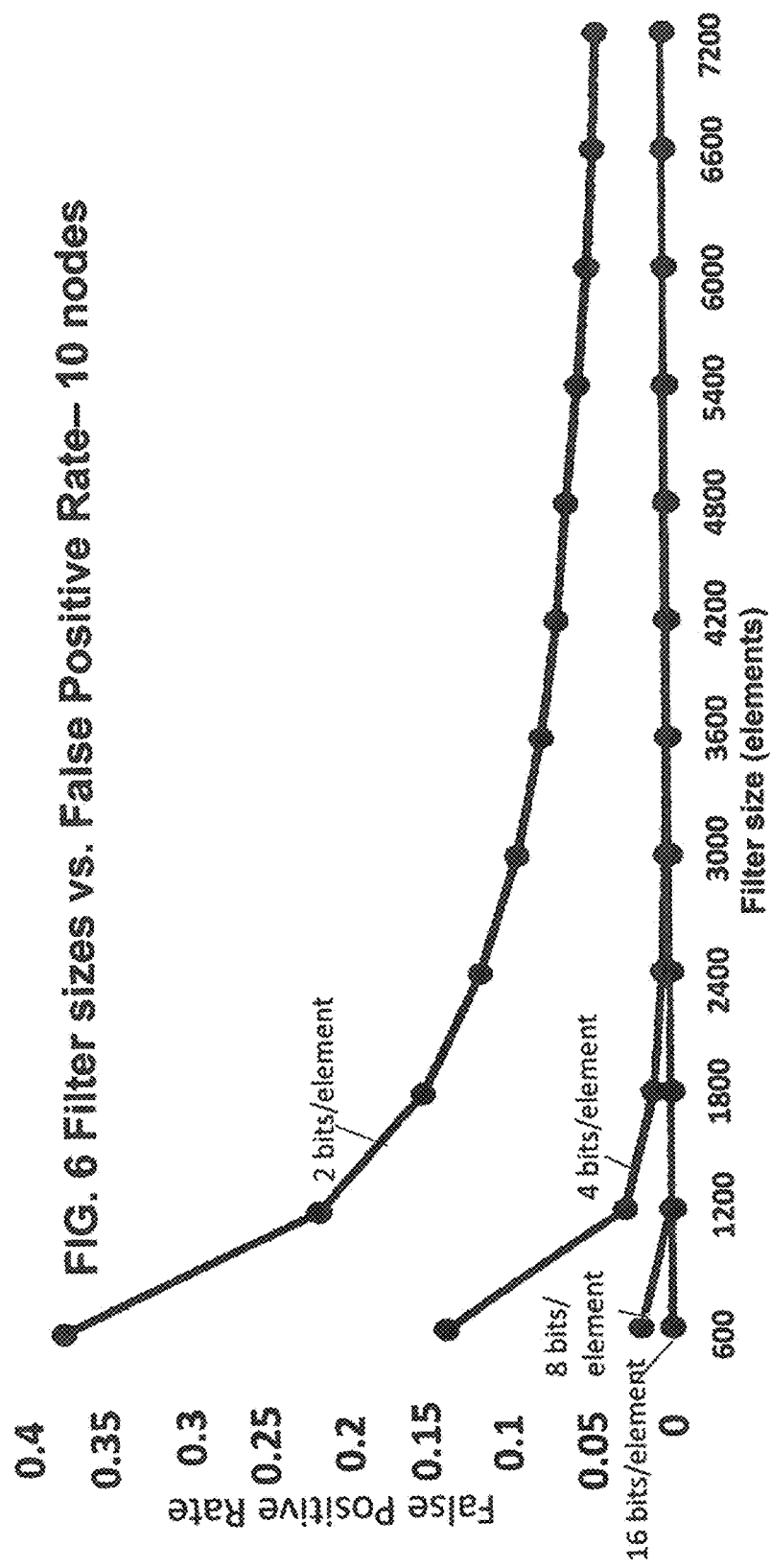

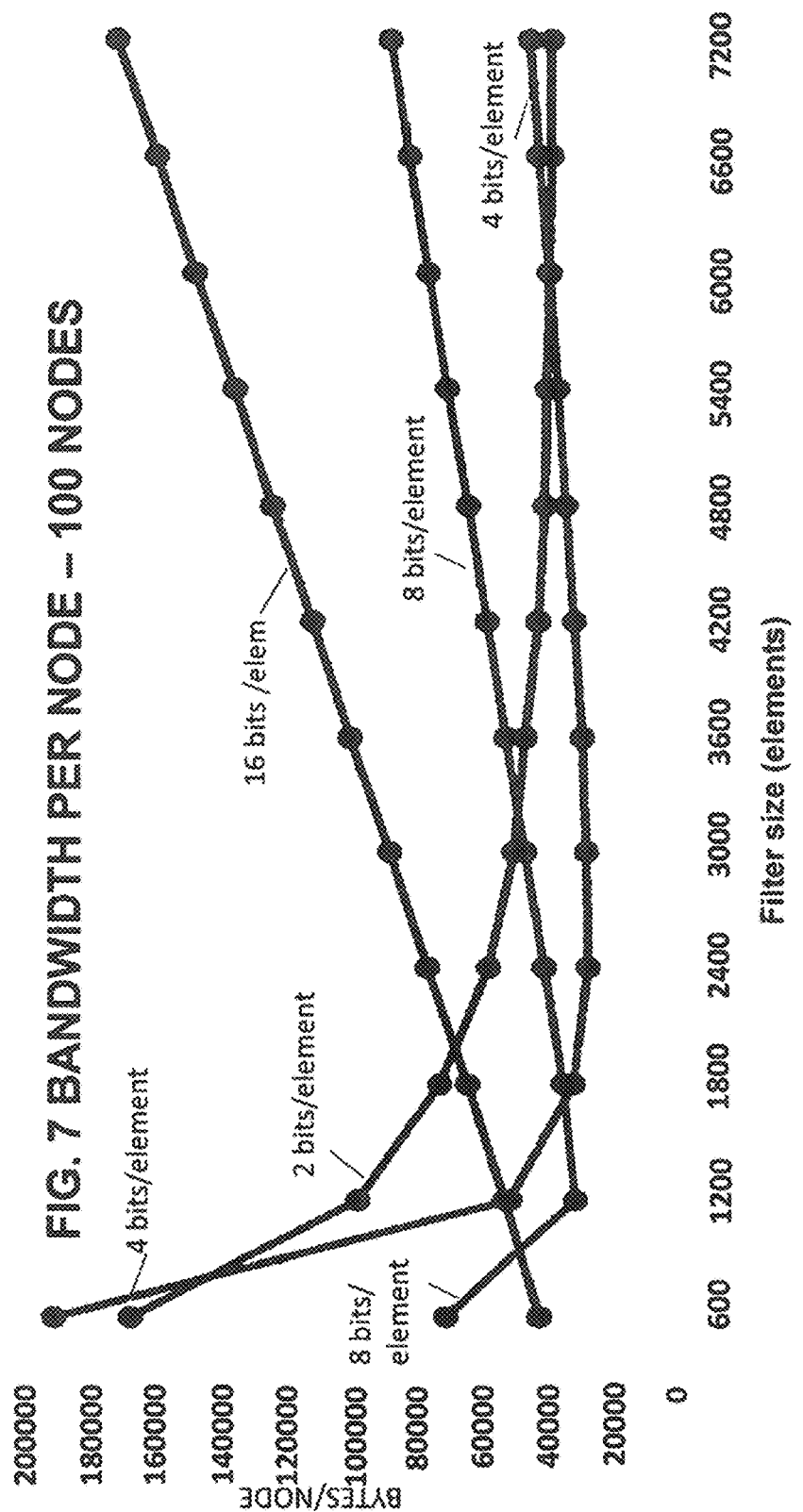

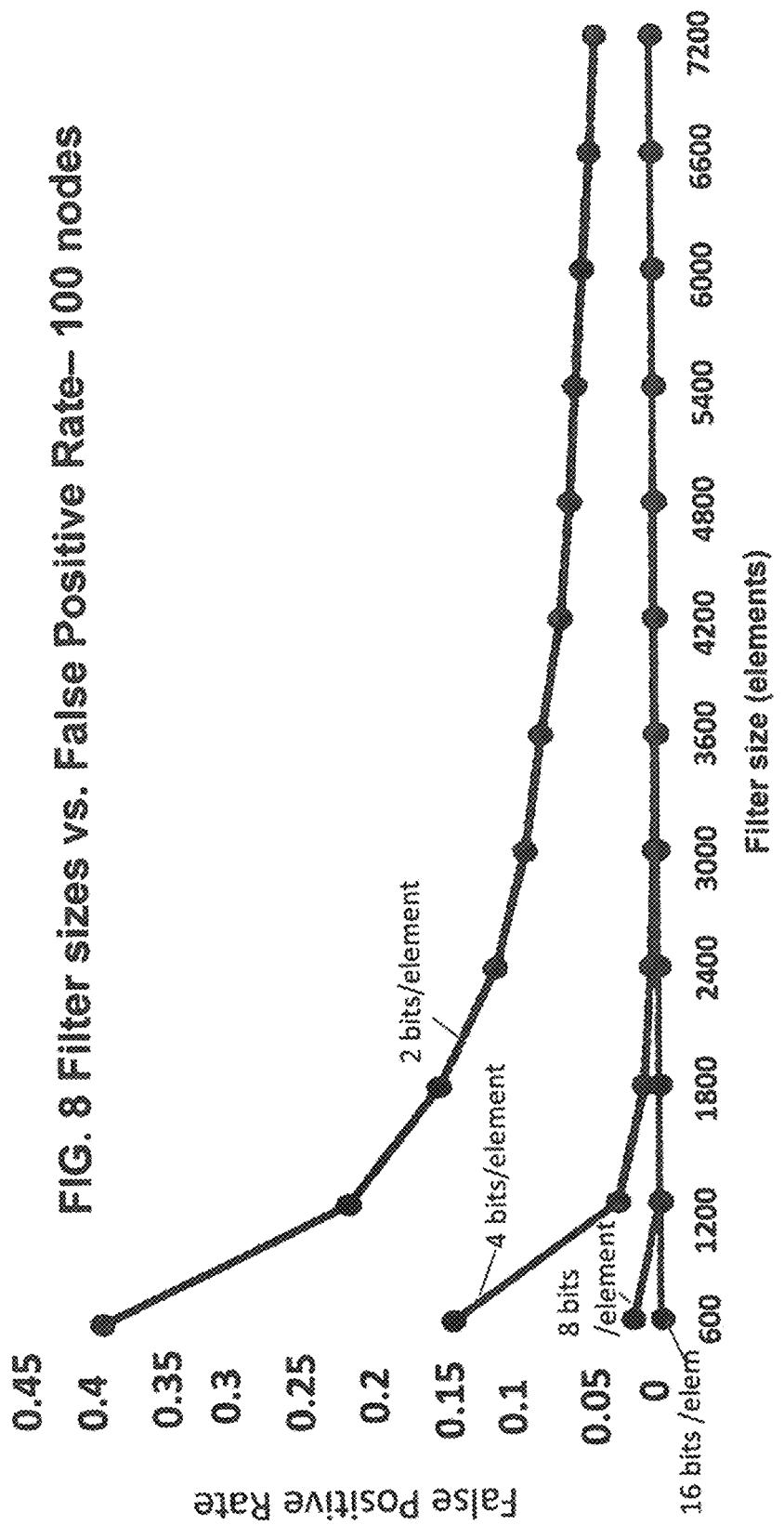

BANDWIDTH CONSERVING SIGNATURE DEPLOYMENT WITH SIGNATURE SET AND NETWORK SECURITY

GOVERNMENT INTEREST

The embodiments herein may be manufactured, used, and/or licensed by or for the United States Government without the payment of royalties thereon.

BACKGROUND OF TILE INVENTION

Current methods of host-based signature sharing require large amounts of bandwidth to transmit potentially sensitive information that can be trivially used to evade host-based defenses if the defended device or update traffic is obtained or captured by an adversary.

Both host and network based security systems can help to detect the presence of an adversary in on networks and operating on our systems. However, traditional host and network based security systems are designed for strategic/enterprise networks where bandwidth, memory and computational resources are readily available. People operating in obscure and/or constrained environments may employ devices with reduced size and weight, which in turn often reduces available battery, bandwidth and computational power. At the same time, the operating environment of these devices may be heavily contested as well, with attackers potentially disrupting network communications and attempting to seize control of these devices concurrent with kinetic operations.

While host based security systems scanning and classification processes can also be resource intensive, one of the most significant issues with enterprise host based security systems operation is its bandwidth requirements. Virus definition or DAT files contain virus signatures and other information that Intel Security anti-virus products use to protect the network against existing and new potential threats. DAT files are released on a reoccurring basis. Normal enterprise host based security systems operation requires a daily distribution of DAT file which contain updated threat/virus signatures along with policy information. On average these files are approximately 80 MB in size. Once this DAT file is downloaded to every node in the network, it must be processed by the host based security system and incorporated into its operation. Although the portion of the DAT file devoted to signatures vs. policy configurations will vary, it is assumed that the signatures occupy a significant portion as is the case with all signature based AV. This transmission and processing at every node is extremely costly to the tactical network as a whole as well as the tactical nodes individually.

Bloom filters have proven to be extremely useful and applicable to a vast range of problems, as reported in A. Broder and M. Mitzenmacher, "Network Applications of Bloom Filters: A Survey," Internet mathematics, vol. 1, no. 4, pp. 485-509 (2004), hereby incorporated by reference. Bloom filters have been used in network security applications using various methods to allow Bloom filters to rapidly classify network packets, often with the goal of intrusion detection. These can either be explicitly signature-based, in which a signature is encoded into a Bloom filter and each packet is flagged if the membership test returns a positive result, or anomaly based, in which normal traffic is encoded into a Bloom filter and membership tests with a negative result are flagged. The work of K. Shanmugasundaram, et al., "Payload attribution via hierarchical bloom filters," in Proceedings of the 11th ACM conference on Computer and communications security (2004), hereby incorporated by reference herein in its entirety, examines the use of hierarchical Bloom filters to attribute packet payloads in the absence of header information by tagging n-grams with their position in a payload and inserting them into a Bloom filter; by examining block lengths of geometrically changing size, the number of Bloom filter membership tests and the degree of confidence of those tests can be controlled. The work of E. H. Spafford, "Opus: Preventing weak password choices," Computers & Security, vol. 11, no. 3, pp. 273-288 (1992), hereby incorporated by reference herein in its entirety, examines a different security policy issue, and uses Bloom filters to enforce password policy. Notably, the noninvertible nature of the Bloom filter is exploited to prevent the re-use of passwords in a manner that is both space-efficient and secure.

There is an obvious and significant need for robust, lightweight, on-device security that can leverage but is not dependent on network connectivity for protection.

SUMMARY

A preferred embodiment of the present invention comprises, inter alia, a malware detection architecture designed to compact and combine malware signatures into a filter with fixed false positive rate. A signature filter is deployed to hosts in computation and bandwidth constrained environments and host scans files on system and incoming data using filter. If the filter returns positive (alert), identification is sent back to central location for additional instruction.

A preferred method for malware detection (operative to compact and combine malware signatures into a malware signature filter with fixed false positive rate) comprises sending a malware signature filter to hosts for scanning by the host; scanning of files on the host system and incoming data using the malware signature filter; if the malware signature filter returns a positive alert, identification is sent back to a central location for additional instruction. In the alternative, the malware signature filter may be a Bloom filter; and the host operates in a computation and bandwidth constrained environment; the malware signatures being compacted and combined into a single malware signature filter to save memory and computational power at the host and bandwidth during the communication of malware signatures. As a further option, each node tests its assigned elements against the malware signature filter and reports back to the central location hashes of positive alert results and the malware signature filter is a bloom malware filter wherein malware signatures are combined and compacted into the bloom malware signature filter; the bloom malware filter being configured to store and examine hashes of files; the hashes of files being preimage resistant hash functions to enable individuals to be equipped with a detection capability without revealing sensitive details about detection capability to the user.

As a further option, each hit is reported as (0.7*b*h) where b is the number of bits per element in the bloom malware signature filter and wherein the size h of the hashes generated by the filter hash algorithms is 20 bytes; and wherein a secure hash function is used for scanning. As a further option the central location compares the suspect hashes against each oracle's malware signature filter, and if a hit results, the central location send the suspect hashes to at least one selected oracle.

A preferred embodiment malware detection system comprises a signature generator for compacting and combining malware signatures into a malware signature filter with a fixed false positive rate; a central location and a plurality of hosts adapted to receive the malware signature filter; the central location configured to send the malware signature filter to each of the plurality of hosts; each host configured to scan files on the host system and incoming data files using the malware signature filter; each host configured such that if the scan of files using the malware signature filter indicates a positive result the file is quarantined; each host configured to send identification back to central location if a false positive result is obtained for additional instruction. As a further option, the malware signature filter contains malware signatures and is utilized for detecting malware.

An alternate preferred embodiment malware detection system (for use in a network that compacts and combines malware signatures into a combined bloom malware signature filter with a fixed false positive rate) comprises: a master oracle, a plurality of oracles and a plurality of nodes; the master oracle being configured to deploy the combined bloom malware signature filter to the plurality of oracles; the plurality of oracles configured to scan files on a system and incoming data using the combined bloom malware signature filter; the oracles configured such that if the combined bloom malware signature filter returns a positive alert, identification is sent back to master oracle for additional instruction.

As a further option each oracle may be configured to generate and send at least one bloom filter to the master oracle; the master oracle being configured to combine the bloom filters from the plurality of oracles into the combined bloom malware signature file that is distributed to the nodes.

As a further option the network may be a mobile ad hoc network that uses existing malware signatures to create the combined bloom malware signature filter; and pre-image resistant hash functions may be utilized in the Bloom filter construction to enhance privacy and /security of digital signatures. A single combined bloom malware filter may be used for multiple independent signature sets and the combined bloom malware filter may be sparsified to add extra capacity and reduce update sizes; and updates may be distributed in peer-to-peer fashion without requiring a central server, and the combined Bloom malware filter is combined with whitelisting. As a further option the combined bloom malware signature filter may comprise pre-image resistant hash functions and multiple signature sets, combined with a scheme for identifying and verifying alerts.

These and other embodiments will be described in further detail below with respect to the following figures.

BRIEF DESCRIPTION OF THE DRAWINGS

FIG. 5 is a graphical illustration of filter sizes vs. bandwidth per node for 10 nodes.

FIG. 6 is a graphical illustration of filter sizes vs. false positives for 10 nodes.

FIG. 7 is a graphical illustration of filter sizes vs. bandwidth per node for 100 nodes.

FIG. 8 is a graphical illustration of filter sizes vs. false positives for 100 nodes.

Figure 1:
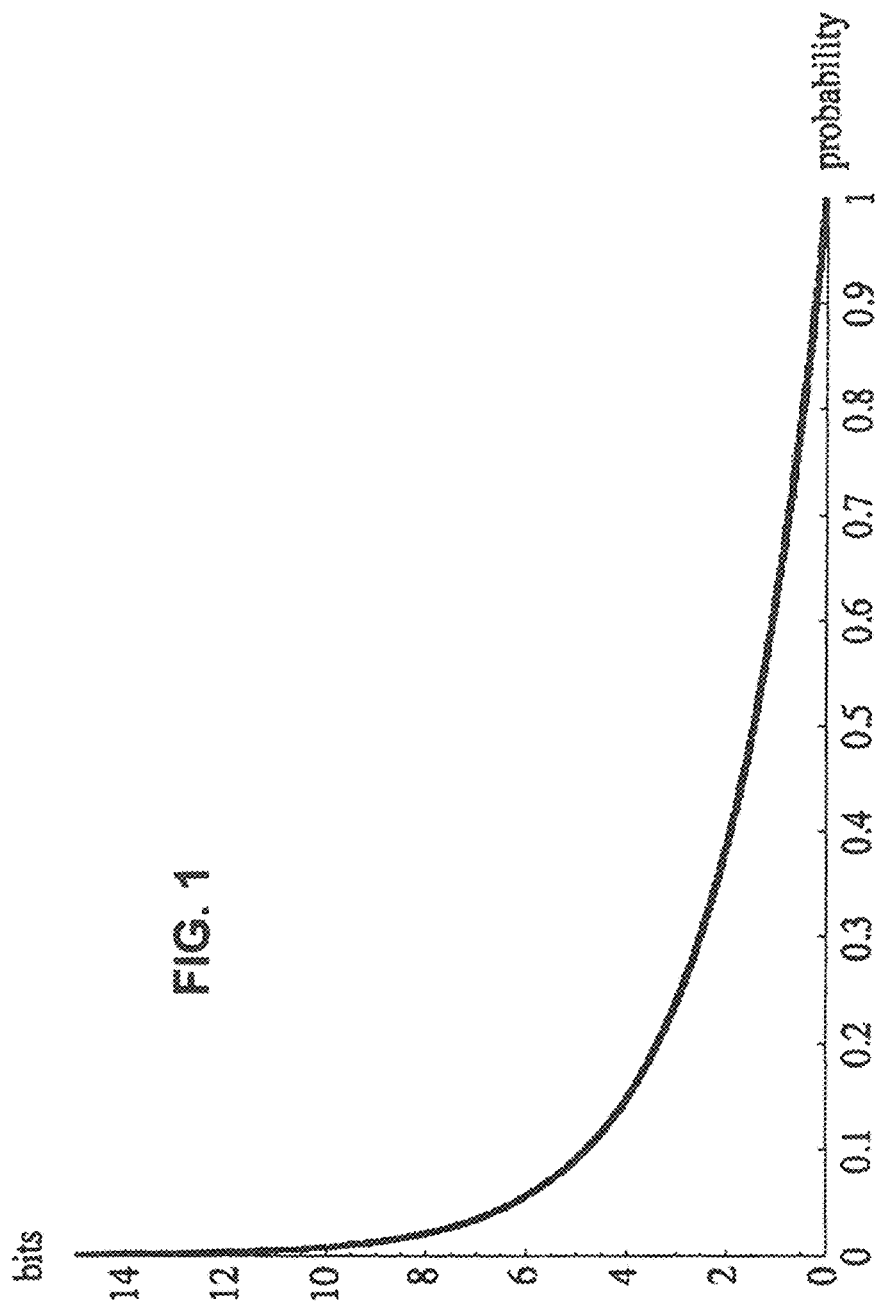
FIG. 1 is a graphical illustration of a probability curve. Doubling the filter size to 2N bytes (16 bits/element) lowers the false-positive rate to 0.1%; further increases in size can further reduce the false positive rate.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DETAILED DESCRIPTION OF THE PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various ranges, elements, components, regions, layers and/or sections, these elements, components, regions, layers and/or sections should not be limited by these terms. For example, when referring first and second ranges, these terms are only used to distinguish one range from another range. Thus, a first element, component, region, layer or section discussed below could be termed a second element, component, region, layer or section without departing from the teachings of the present invention.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent. As may be used herein, the term "substantially negligible" means there is little relative difference, the little difference ranging between less than one percent to ten percent.

As may be used herein, the term "significantly" means of a size and/or effect that is large or important enough to be noticed or have an important effect.

As used herein the terminology "substantially all" means for the most part; essentially all.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention. Additionally, the drawings are not to scale. Relative sizes of components are for illustrative purposes only and do not reflect the actual sizes that may occur in any actual embodiment of the invention. Like numbers in two or more figures represent the same or similar elements. Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Embodiments of the present invention are described herein with reference to cross-section illustrations that are schematic illustrations of idealized embodiments of the present invention. As such, variations from the shapes of the elements in the illustrations are to be expected. Thus, embodiments of the present invention should not be construed as limited to the particular shapes of regions illustrated herein but are to include deviations in shapes. Thus, the layers or regions illustrated in the figures are schematic in nature and their shapes are not intended to illustrate the precise shape of a layer or region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is directed to a malware detection architecture operative to compact and combine malware signatures into a filter with fixed false positive rate. Signature filter is deployed to hosts in computation and bandwidth constrained environments and host scans files on system and incoming data using filter. If filter returns positive (alert), identification is sent back to central location for additional instruction and the alert causing item is quarantined.

Compacting, combining signatures into a single filter operates to save memory and computational power at the host and bandwidth during the communication of signatures. Signatures may be used detect the presence of malware, while at the same time preventing the leakage of potentially sensitive information about the malware signatures.

Compaction and combining signatures is conducted in a way that will save resources (memory, power and bandwidth). The use of Bloom filters to store and examine hashes of files rather than n-grams or some other representation. The use of previously known properties of Bloom filters to combine signature sets that must be handled at different classification levels without loss of security. The use of previously known properties of hash functions to produce unique per-user signature sets to enable traceability of these signature sets. The use of pre-image resistant hash functions to enable individuals to be equipped with a detection capability without needing to reveal potentially sensitive details about that detection capability to them. Ability to update filters incrementally so that nodes can share self-generated signatures in an efficient way. The combination of all of these properties into a single system and method that addresses multiple problems of on-device resource usage, network bandwidth, individual traceability, and the security of signatures both in transit and at rest on devices, particularly in contested tactical environments.

Resource efficient DCO signature deployment to nodes in a mobile ad boc network (MANET). Sharing of signature sets in a secure fashion with coalition partners without permitting reverse engineering. High-speed content analysis of high-throughput network links. Secure distribution of signature sets over untrusted or insecure channels. Adding additional signatures to the filters in a bandwidth conserving manner. Potential uses include Resource efficient DCO signature deployment to nodes in a mobile ad hoc network (MANET). Sharing of signature sets in a secure fashion with coalition partners without permitting reverse engineering. High-speed content analysis of high-throughput network links. Secure distribution of signature sets over untrusted or insecure channels. Adding additional signatures to the filters in a bandwidth conserving manner.

A concept of the present invention is that if one is willing to accept a small false positive rate, the use of a Bloom filter effectively allows for the compression of a set membership test that can then be performed in O(1) time, so long as the items to be checked for membership can be hashed. As an ancillary benefit, the use of the hash functions can make it difficult to recover the items inserted to the Bloom filter, mitigating the risk of information leaks.

The publication P. S. Almeida, et al., "Scalable bloom filters," Information Processing Letters, vol. 101, no. 6, pp. 255-261 (2007), hereby incorporated by reference herein in its entirety, examines the construction of Bloom filters that can dynamically adapt to the number of stored elements, essentially by constructing a series of single hash function Bloom filters that can be extended by simply introducing a new hash function. The publication M. Mitzenmacher, "Compressed bloom filters," IEEE/ACM Transactions on Networking, Vol. 10, No. 5, pp. 604-612, (2002), hereby incorporated by reference herein in its entirety, examines the use of compression techniques on Bloom filters with "wasted" capacity to further reduce the bandwidth requirements for distributing Bloom filters via information-theoretic arguments. The present invention examines the effect of distributing Bloom filters that could be regularly updated without exhausting their capacity and also considers the impact of hash retransmission, which is not examined in the Mitzenmacher publication.

A preferred embodiment of the present invention, inter alia, examines the application of Bloom filters to distributing HBSS signatures in an austere network; in particular, utilizes a method of mitigating false positives requires a retransmission, which must be accounted for in bandwidth utilization.

At times signatures must be obfuscated, either to protect the privacy of the signature itself or to prevent an adversary from correlating the use of such signatures (for instance, monitoring the effectiveness of an attack by determining which tactical nodes are reporting it).

The present invention is directed to an architecture that facilitates the hierarchical compression and encoding of malware signatures for deployment on hosts in constrained environment using disparate oracles for accurate detection to enable cyber situational awareness and defensive cyber operations. In an effort to attempt to reduce the memory, bandwidth and computational load of the current host based security systems so that it may be operationally feasibility within a tactical network, the present invention incorporates leverage concepts from research in network intrusion detection for tactical networks, such as those described in R. Chang, et al., "Extremely Lightweight Intrusion Detection (ELIDe)," Army Research Laboratory, (2013), hereby incorporated by reference as though fully written herein, and log aggregation and compression work as reported in D. Zhang, et al., "On Effective Data Aggregation Techniques in Host-based Intrusion Detection in MANET," in Proc. 10th Annual IEEE Consumer Communications and Networking (2013), hereby incorporated by reference as though fully rewritten herein, along with a new effort in scalable methodologies borrowing concepts from scalable video compression and encoding. This combination of methods allows for significant bandwidth savings with O(1) lookups while maintaining confidentiality of sensitive signature information.

The following contains a brief summary of Bloom filters and the theoretical predictions for a preferred method of the present invention based on their idealized properties, followed by a higher level architecture that coordinates signature sets across separate oracles. Experimental results from a simulation study using a known corpus of malware hashes are presented.

Bloom Filters

Bloom filters, as reported in B. H. Bloom, "Space/time trade-offs in hash coding with allowable errors," Communications of the ACM, Vol. 13, No. 7, pp. 422-426 (1970), hereby incorporated by reference in its entirety as though rewritten herein, are a probabilistic data structure that allow for constant time checks for set membership with zero false negatives and a false positive rate that can be controlled by the parameterization of the filter. In its simplest original presentation, it consists of a set of m bits that are all initialized to zero. To insert an item, k different hash functions (in practice, typically a single hash function with k salts) are applied to the item and the results are truncated to lie in the range. The bits corresponding to the results are set to 1.

To test an item to see if it has been previously inserted, the same k hash functions are used to generate values in the same range, and the bits at those locations are read. If all bits are set to 1, then a positive result is returned, otherwise the result is negative.

The impossibility of a false negative result is self-evident; false positives are possible if the k bits have been set by some other combination of objects, and not the test object By treating the k hash functions as deterministic pseudorandom number generators that produce (by assumption) k statistically independent pseudorandom numbers for each item inserted, the probability of this can be estimated in terms of the number of items N that have been inserted into the filter, the number of bits m in the filter, and the number of hash functions k:

$$(\text{error}) \approx (1-e^{-kN/m})^k$$

As noted in M. Mitxenmacher, "Compressed bloom filters," IEEE/ACM Transactions on Networking, vol. 10, no. 5, pp. 604-612 (2002), hereby incorporated by reference as though rewritten herein, increasing m, in addition to making the filter sparser and hence more compressible, also decreases the false positive rate; this property is used below to facilitate dissemination of the filter in increments.

In addition to the compact representation, Bloom filters can also be combined in a straightforward manner; adding the elements of one filter to another can be performed by a straightforward OR operation on the bits of the filter. This may be exploited for both the construction of composite signature filters (CSFs) produced by separate signature sets and progressive updates of the filter, below.

It is noted that maintaining the ratio N/m maintains a constant error rate, holding all other parameters equal. If this ratio is set to ⅛, or 8 bits per inserted item, the following is obtained:

$$(\text{error}) \approx (1-e^{-k/8})^k$$

The optimal number (with respect to the false positive rate) of hash functions k can be immediately found to be 6 in this case, using the formula k=m ln 2n, yielding a Bloom filter m bytes in size (8 bits per element) with an expected false positive rate of approximately 2%. Doubling the filter size to 2N bytes (16 bits/element) lowers the false-positive rate to 0.1%; further increases in size can further reduce the false positive rate (as show in FIG. 1).

This enables significant compression of a signature set while still enabling accurate initial detection of malware. For example, the PE-section hash database of the ClamAV signature set contains 2,277,408 MD5 hashes, or 36 MB of data at 16 bytes per hash. A Bloom filter of the hash set using 8 bits per element would require 2.1 MB, requiring 1/16 of the bandwidth to distribute to each node. If the Bloom filter is initially generated with reserve capacity, very small delta updates of approximately 6 bits per additional element (0.7*bits per element) can be subsequently distributed and applied to the filter without significantly impacting the false positive rate. In addition, the sparse nature of a Bloom filter with significant reserve capacity may permit it to be compressed still further (for example, via simply indexing the locations of set bits, rather than distributing the entire bit string).

B. System Architecture

Figure 2:
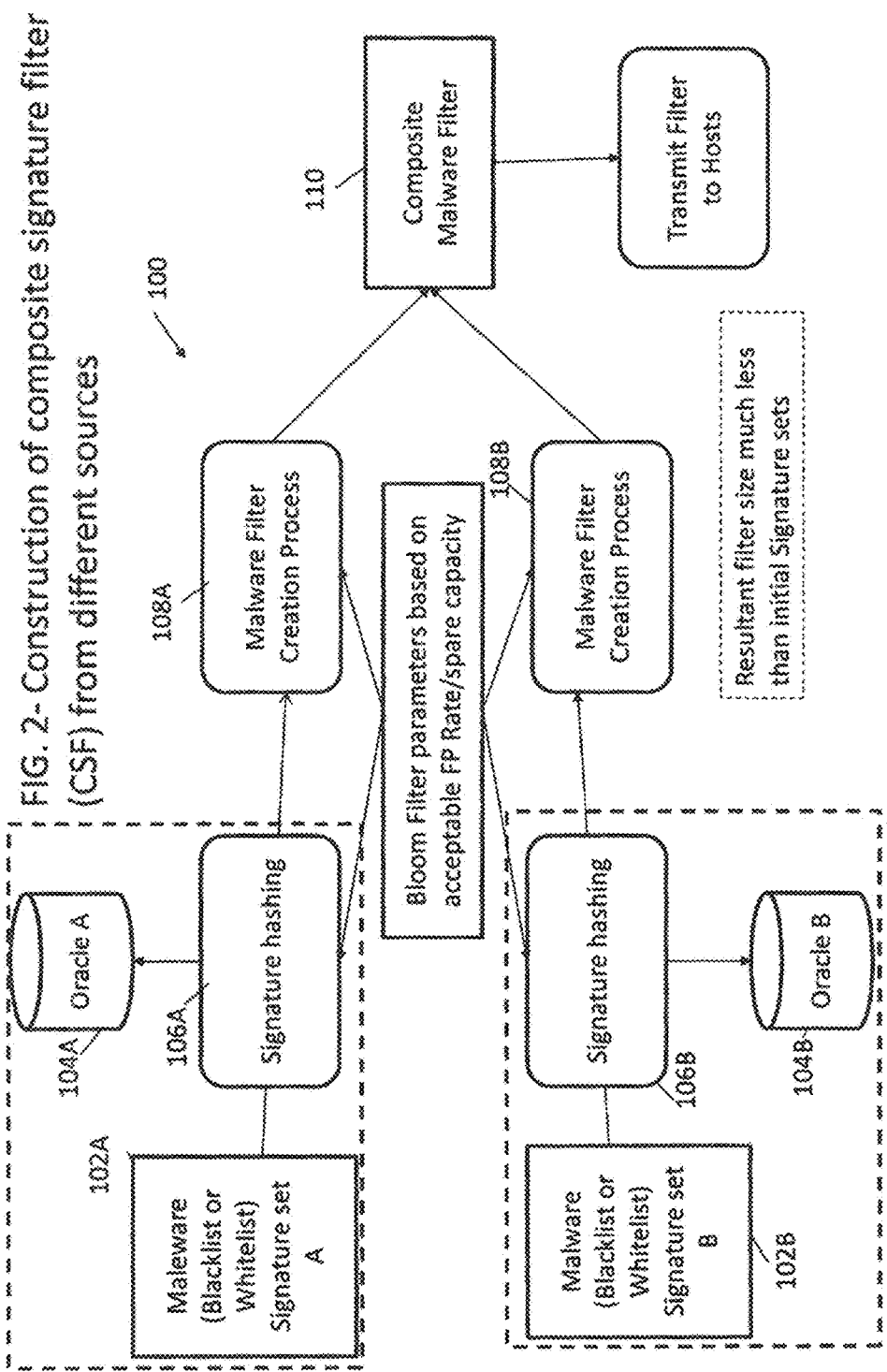
FIG. 2 is an illustration showing a preferred method of the present invention for construction of composite signature filter (CSF) from different sources.

A diagram depicting the preferred embodiment architecture is shown in FIG. 2. The preferred embodiment system 100 comprises oracles 104A and 104B operatively associated with malware signature sets 102A and 102B lists in conjunction with signature hashing procedures 106A and 106B. In accordance with the present invention, the malware filter creation blocks 108A and 108B (from oracles 104A and 104B, respectively) are combined via a composite malware filter 110 and outputted to the hosts.

An acceptable false positive rate is determined based on bandwidth and manpower considerations, and used to select a set of hash functions (in practice, a single hash function and a set of hash salts is selected). Signatures from multiple sources (e.g. sensitive signatures, signatures from open source intelligence, device-specific signatures) are created on appropriate equipment and hashed using the pre-determined hash functions. For each signature, a set of bashes

[H1(*s*), H2(*s*) ... Hk(*s*)] are sent to a central signature deployment control point, and a mapping of hashes to signatures is maintained in each oracle. The total number of bashes N received is used to generate a set of Bloom filters of size mNk bits, where m is the desired bits/element. Assuming preimage-resistant hash functions are used, it will not be computationally feasible to reconstruct the signatures of the malware from the hashes or filters ii, and hence they can be distributed with much lower risk than the original signatures. These signature filters can be combined via a bitwise OR operation, creating a CSF which can then be distributed to hosts in either an incremental or differential fashion, along with the hash function(s) and salts used to generate the filters.

Figure 3:
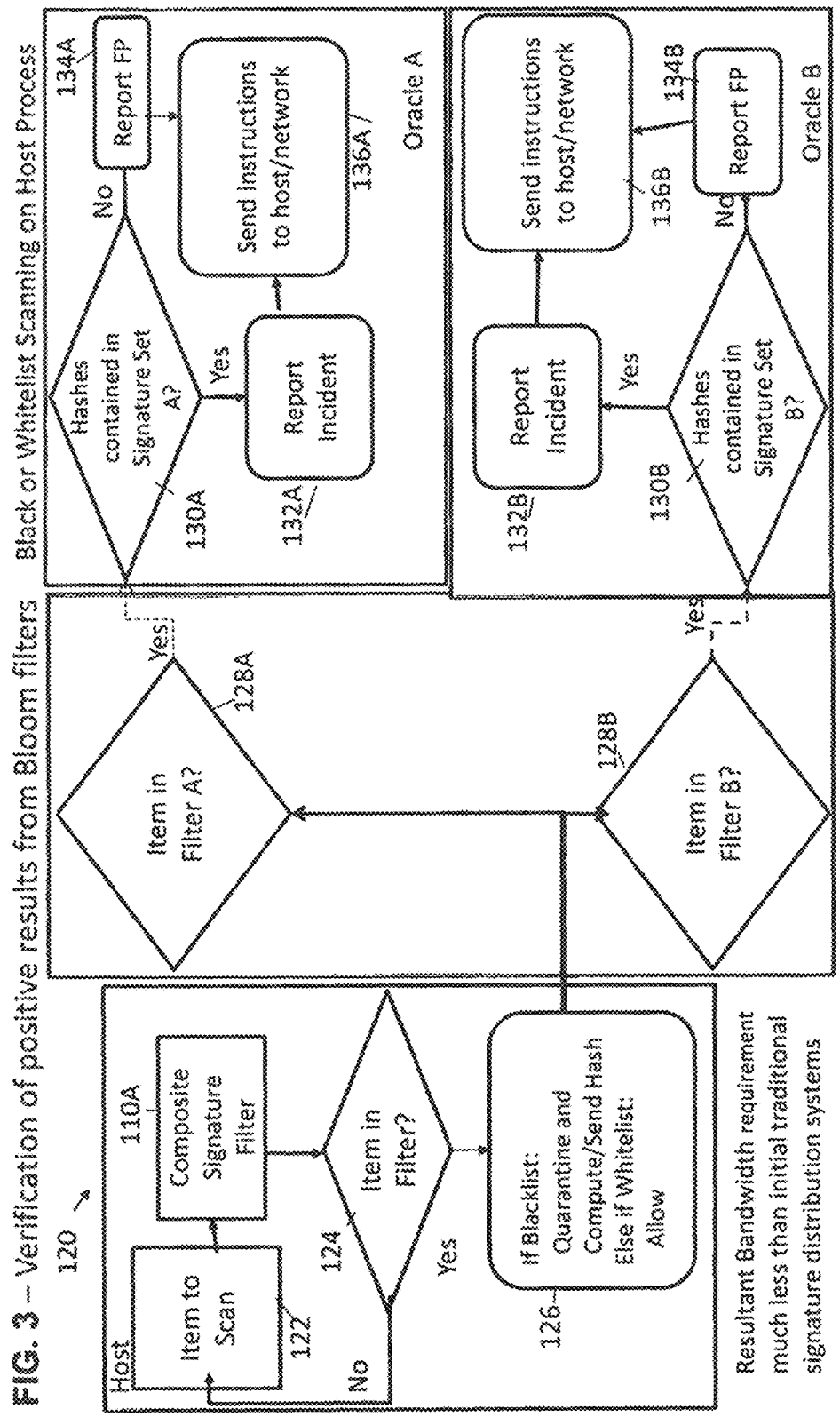
FIG. 3 is a schematic block diagram of a preferred embodiment procedure of the present invention involving verification of positive results from Bloom filters.

Testing proceeds as depicted in FIG. 3. Shown in FIG. 2 is a preferred methodology 120 for verification of positive results from Bloom filters. An item to be scanned 122 passed through a composite signature filter. If the item 122 is in filter 110A (block 124) it is blacklisted, quarantined and hashed. If the item 122 is not in the filter, the item may be white listed and the next item 122 is processed. Testing continues in Blocks 128A and 128B. Positive results enter oracles A and B of FIG. 3 and the preferred embodiment continues to determine if hashes are contained in signature sets A and/or B (blocks 130A and 130B of oracles A and B). If yes, the incident is reported in blocks 132A, 132B, and instructions are sent to the hosts and/or network. If no, the FP is reported in blocks 134A and 134B.

Once the filter is received at the host, items are scanned by the host and tested for inclusion in the composite signature filter (CSF) 110A. If the test results in a negative filter response, the item is released and the system begins to scan the next item. In block 122. Upon a positive response, the item is quarantined (as depicted in block 126). A signature and hashes are computed with the same method used for filter generation and sent to the central signature deployment control point (similar to the ePolicy Orchestrator (ePO) of HBSS system) for true/false positive testing against each source's Bloom filter. For each source, if a Bloom filter positive is determined the signature hashes are forwarded to the specific oracle for that source. If the source oracle(s) determines a true positive, then appropriate actions can be communicated depending on the sensitivity of the device in question and the signatures managed by the responding oracle. If a false positive is detected by all responding oracles, this information can be used by the central oracle and relayed back to the endpoint(s) for quarantine release and whitelisting purposes.

Figure 4:
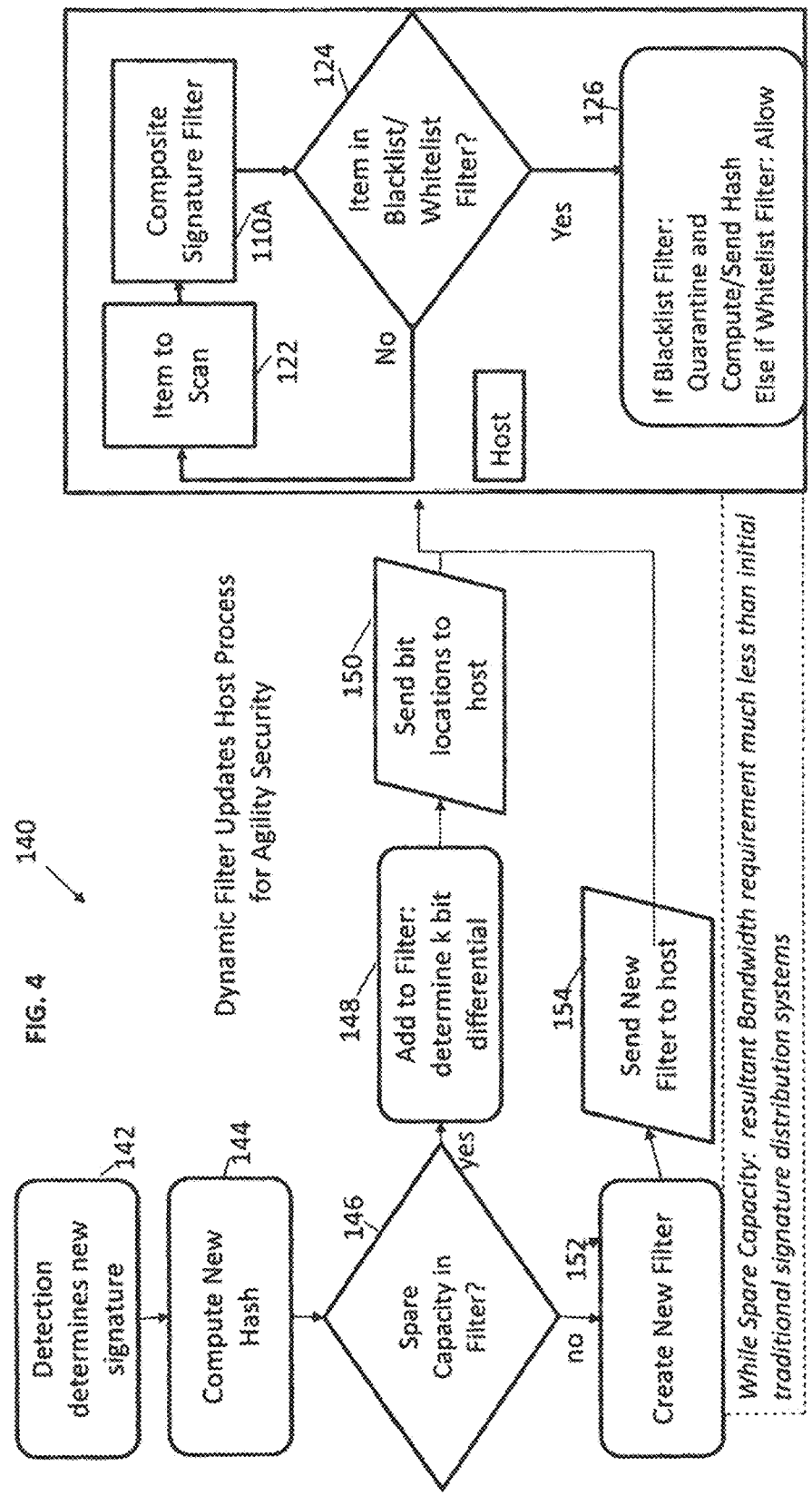
FIG. 4 is a schematic block diagram of a preferred method of the present invention relating to a dynamic filter updating process for agility security.

FIG. 4 is a schematic block diagram of a preferred method 140 of the present invention relating to the filter updating process. When detection determines a new signature is needed (block 142), a new hash is computed in block 144. If there is spare capability in the filter (block 146), an addition is made to the filter in block 148 and locations set to the host, else a new filter is created in block 152 and the new filter is sent to the host in block 154. As to the remaining elements of FIG. 4, see the corresponding elements in FIG. 3.

C. Experimental Validation

A simulated network was created consisting of two Oracles, a Master Oracle (the signature deployment control point) and a number of nodes.

100,000 data elements were generated by SHA-256 hashing strings of uniformly random values. Of these elements, 100 elements were selected to be malware signatures assigned to Oracle A, and 500 elements were selected as malware signatures assigned to Oracle B. This implies a fixed size set of 600 "bed" hashes, which were used to populate the Bloom filters. The full set of elements was distributed to the nodes in a random manner such that each node is assigned 100000/n elements, where n represents the number of nodes.

During the procedure Bloom filters were generated by each Oracle and sent to the Master Oracle. The Master Oracle combines the filters from all oracles resulting in the CSF and distributes them to the nodes. The bandwidth requirement of filter deployment was calculated to be (n*f) where f is the filter size in bytes.

In accordance with the preferred embodiment, during general operations, each node tests its assigned elements against the composite filter and reports back to the Master Oracle hashes of positive results. The bandwidth requirement of reporting each hit as (0.7*b*h) where b is the number of bits per element in the filter and b is the size (in bytes) of the hashes generated by the filter hash algorithms. The SHA-1 algorithm is used for these tests, therefore h=20 bytes.

The Master Oracle compares the suspect hashes against each Oracle's filter, and if a hit results, send the suspect hashes to the selected Oracle(s). The Oracle's policy for the signature determines the action the node/network should take as a result of a positive finding. The action is then broadcast to the network to allow action and caching to be taken by all nodes. The bandwidth requirement of the result broadcast is calculated as (0.7*b*h)+1, with one byte added to indicate the action to be taken (quarantine, release, etc.).

Simulations were performed using 10 and 100 nodes. For each simulation, the filter parameters were varied between 2 and 16 bits per element, with the filter size between 600 and 7200 elements (providing excess capacity for potential future updates). Results are detailed below; note that increasing the bits per element decreases the false-positive rate at the expense of both filter size and the bandwidth required to relay hashes. Increasing the filter size similarly decreases the false positive rate, but has a relatively minor impact on the bandwidth required for the hashes.

In all cases, increasing the filter size or the number of bits per element will lead to a decrease in false positive rate (as shown in FIG. 6 and FIG. 8), which in turn leads to a decrease in the bandwidth requirements of the network, however this must be balanced against the increase in usage that both parameters cause with respect to the distribution of alerts and the initial filter. As visible from FIG. 5 through FIG. 8, the selection of optimal filter size and bits per element is complex, and leads to conclusions that often differ substantially from classical Bloom filter results (see, e.g., M. Mitzenmacher, "Compressed bloom filters," IEEE/ACM Transactions on Networking, vol. 10, no. 5, pp 604-612, 2002.).

FIG. 7, which displays the tradeoff between bandwidth, bits per element, and total filter size, shows this perhaps the most clearly; at a value of 4 bits per element, with a fixed number of malicious elements, the increasing filter size first reduces the false positive rate (as the number of collisions decreases) and hence retransmission bandwidth requirements, however eventually the overhead associated with transmitting the filter begins to dominate the total bandwidth required. The relative ranking of total bandwidth required as a function of bits per element also changes (still referring to FIG. 7) as the filter size varies. If the filter is sized for just 600 elements in total (a reserve capacity of 500 elements), then the false positive rate dominates the bandwidth, and so 16 bits per element provides the lowest total utilization; at the other extreme (a reserve capacity of 7100 elements), the use of 2 bits per element is optimal.

In many cases, particularly for a low number of bits per element, overprovisioning a filter may lead to an overall decrease in the total bandwidth requirements for the system, regardless of whether or not that excess filter capacity will ever be used. This phenomenon is more pronounced in smaller networks (10 nodes), however remains visible for 2 bits per element in the 100 node network.

An advantage of the present invention is that significant reduction is obtained in the total bandwidth required. Illustrative results are shown in Table 1; direct distribution of signatures requires 6410000 bytes per node in a 10 node network. If the filter is sized for 600 elements (a reserve capacity of 500 elements), then the false positive rate dominates the bandwidth, and so 16 bits per element provides the lowest total utilization; at the other extreme (a reserve capacity of 7100 elements), the use of 2 bits per element is optimal.

In many cases, particularly for a low number of bits per element, overprovisioning a filter may lead to an overall decrease in the total bandwidth requirements for the system, regardless of whether or not that excess filter capacity will ever be used. This phenomenon is more pronounced in smaller networks (10 nodes), however remains visible for 2 bits per element in the 100 node network.

TABLE 1

BANDWIDTH CONSUMPTION UNDER DIFFERENT SCENARIOS (BYTES/NODE)

|  | 10 nodes | BW savings | 100 nodes | BW savings |
| --- | --- | --- | --- | --- |
| Naïve signature distribution | 6,410,000 |  | 641,000 |  |
| Bloom filters: worst case | 178,521 | 97.2% | 18,950 | 97.0% |
| Bloom filters: false positive rate FPR < 0.05 | 10,619 | 99.83% | 2,545 | 99.6% |

Even without optimization of the filter size (such as when the false positive rate is less than 0.05), significant reduction is obtained in the total bandwidth required by the preferred method of the present invention. Illustrative results are shown in Table 1; direct distribution of signatures requires significant usage of bandwidth per node. The use of Bloom filters without any optimization results in approximately a 36-fold decrease in requirements, or a 97.2% bandwidth savings, while modest tuning results in over 600-fold reduction in per-node bandwidth requirements or 99.83%. The difference is slightly reduced in the larger network of 100 nodes, however the use of naïve parameters results in a 33-fold decrease or a 97% bandwidth savings, and careful selection results in 99.6% bandwidth savings—over a 250-fold decrease.

By using the presented approach, it is anticipated the present invention will enable reduction in both the bandwidth and on-device requirements that make enterprise-style host based security systems feasible at the tactical edge, while simultaneously greatly mitigating the risk to security posed by lost or captured devices, or adversarial monitoring of related traffic. Even without optimization of the filter size, a significant reduction is obtained in the total bandwidth required by our method resulting in a minimum bandwidth savings of 97% for networks with size varying between 10 and 100 nodes.

The present inventions provides, inter alia bloom filters with preimage resistant hash functions, and multiple signature sets, combined with a scheme for identifying and verifying alerts, that provide new security capabilities that other systems lack. The present invention provides a set of capabilities tailored to the unique problems of mobile ad-hoc networks, rather than fixed infrastructure networks. The present invention considers the impact of false positive rates are considered along with their impact on bandwidth and provides a method for minimizing total required bandwidth when traffic due to false positives is taken into account. Whitelists are used and the present invention can also operate in peer-to-peer mode, which allows for continuing operations in the event that the centralized point of control is unavailable or destroyed.

Potential expansion of the concepts of the present invention include investigation of various strategies for scalable signature deployment as well as alert and action correlation to achieve potential bandwidth gains among similar nodes in the network. The use of hierarchical Bloom filters of increasing length may allow for 'on-demand' presentation of composite signature sets to tactical nodes, requesting more fine-grained signatures as required to narrow in on the scope of a particular event, file, or intrusion making the signature deployment system dynamic with the operating environment.

As used herein, the terminology "oracle" means a node having an elevated knowledge source/memory.

As used herein, the terminology "Bloom filter" (as defined in Wikipedia) refers to a space-efficient probabilistic data structure that is used to test whether an element is a member of a set. False positive matches are possible, but false negatives are not, thus a Bloom filter has a 100% recall rate. A query returns either "possibly in set" or "definitely not in set". Elements can be added to the set, but not removed (though this can be addressed with a "counting" filter). The more elements that are added to the set, the larger the probability of false positives.

As used herein the terminology "signature filter" includes but is not limited to a bloom filter that contains HBSS (Host Based Security System) signatures in compressed and non-invertible form.

As used herein the terminology "Host Based Security System (HBSS)" refers to a security system that identifies and defends against threats and attacks only on the device on which it is installed. Examples of HBSSs include but are not limited to process monitors, network traffic analyzers, anti-virus platforms, and exploit mitigation toolkits.

As used herein the terminology "oracle" refers to a system external to a mobile ad-hoc network that a) contains detailed detection information for a wide range of malicious network artifacts; b) can convert such detection information into a Signature Filter, and c) can provide definitive classification of a network artifact as malicious or benign.

As used herein, the terminology "digital signature" refers a code or series of bits attachable to a message that uniquely identifies the sender that may be used for authentication and which may be encrypted.

As used herein, the terminology "intrusion signature" refers a record of a system intrusion, which may be part of an intrusion detection system. Evidence of a system intrusion may be left by a malicious attack against a system in that system's logs.

As used herein the terminology "master oracle" means an oracle that coordinates tasks between two or more oracles, which may operate at different levels of security classification.

As used herein the terminology "central location" refers to a site that can contain and protect oracles and master oracles from adversarial activity, and may not be subject to the same bandwidth and processing constraints as a mobile tactical network.

As used herein the terminology "node" refers to any device that participates in the communications in a network.

As used herein, the terminology "host" refers to a node that performs computation based on inputs from the network, and may be protected by a Host Based Security System.

As used herein the terminology "false positive" refers to a determination that a network artifact (as defined below) is malicious, when it is in fact not.

As used herein, the terminology "virus signature" or "malware signature" refers to a string of bits or patterns of bits, of a virus that can be used to detect and identify it. Anti-virus software may use virus signatures to scan for the presence of malicious code.

As used herein the terminology "network artifact" refers to any data recovered from network traffic; including but not limited to network communications; data files; executable files; interpretable source code; network control messages; or any other form of electronic information that is operated on by hosts on the network and could serve as a vector by which those hosts are subverted.

As used herein the terminology "whitelist" relates to a list of applications that have been granted permission and/or approved by a user, administrator, master oracle, and/or oracle. When an application attempts to execute, it is automatically checked against the whitelist and, if found, permitted to execute. Hashing may be added as an integrity check measure to ensure that the application is authorized and not an inappropriate one with the same name. Whitelisting is well suited for system with limited function such as constrained systems like vehicles, Internet of Things and embedded systems.

As used herein the terminology "Blacklist" is a list of undesirable applications that are prevented from running.

As used herein the terminology "cryptographic hash function' or "hash function" refers to a mathematical algorithm that maps data of arbitrary size to a fixed sized bit string (hash function) designed to be a one-way function as it is infeasible to generate the message from the hash value (invert). The input data may be called the message, and the output (the hash value or hash) may be called the message digest or digest. According to Wikipedia, a small change to a message changes the hash value so extensively that the new hash value appears uncorrelated with the old hash value and it is infeasible to find two different messages with the same hash value. Hash values may be used in digital signatures, message authentication codes (MACs), and other forms of authentication.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

The invention claimed is:

1. A method for improved malware detection operative in a distributed computer network system having a central computer and a plurality of host computers, the method comprising:
    combining, at the central computer, at least one filter for one malware signature with at least one filter for another malware signature to form a combined malware signature filter having a fixed false positive rate using filter hash algorithms;
    sending the combined malware signature filter from the central computer to the host computers;
    scanning performed by each of the host computers including:
        scanning files and incoming data using the combined malware signature filter;
        generating hashes for the files and incoming data scanned and corresponding filters using filter hash algorithms; and
        testing the generated corresponding filters against the combined malware signature filter,
    when the combined malware signature filter identifies a suspect hash resulting in a positive response during testing, the host computer that is performing the scanning reports a positive alert to the central computer including the generated corresponding filter for the suspect hash,
    wherein there is a limitation of bandwidth requirement for the positive alert identification reporting of 0.7*b*h bytes, where b is number of bits per element in the combined malware signature filter and h is size in bytes of the hashes generated by filter hash algorithms; and
    in response to receiving the positive alert report including the generated corresponding filter from one of the host computers, the central computer broadcasts the received generated corresponding filter for the suspect hash to at least another of the host computers,
    wherein there is a limitation of bandwidth requirement of broadcast of 0.7*b*h+1 bytes, with the one byte added to indicate an action to be taken corresponding to quarantine or releasing.

2. The method of claim 1 wherein the combined malware signature filter is a Bloom filter configured to store a plurality of hashes.

3. The method of claim 2 wherein the combined Boom malware signature filter comprises preimage resistant hash functions and multiple signature sets, combined with a scheme for identifying and verifying alerts and wherein the system is used to detect malware in mobile ad-hoc networks; and wherein the combined Bloom malware signature filter incorporates whitelists that and wherein the combined Bloom malware signature filter can operate in peer-to-peer mode allowing for continuing operations in the event that a centralized point of control is unavailable or destroyed.

4. The method of claim 2 wherein the combined Bloom malware signature filter is a probabilistic data structure that allow for constant time checks for set membership with zero false negatives and a false positive rate that can be controlled by a parameterization of the filter; and wherein the combined Bloom malware signature filter comprises a set of m bits that are initially zero and when an item is inserted k different hash functions are applied to the item and results are truncated to lie in a predetermined range and the bits corresponding to the results are set to 1.

5. The method of claim 4 wherein to test an item to see whether it has been previously inserted, the same k hash functions are used to generate values in the same predetermined range, and bits at those locations are read; and provided all bits are set to 1, then a positive result is returned, otherwise the result is negative; whereby a false negative result is not possible and a false positive is possible when k bits have been set by some other combination of objects and not the test object; and wherein the k hash functions are treated as deterministic pseudorandom number generators that produce k statistically independent pseudo-random numbers for each item inserted, and wherein the probability can be estimated in terms of number of items N that have been inserted into the filter, number of bits m in the filter, and number of hash functions k.

6. The method of claim 2 wherein the combined Bloom malware signature filter is a space-efficient probabilistic data structure that is used to test whether an element is a member of a set and wherein false positive matches are possible, but false negatives are not and wherein a query returns either possibly in set or definitely not in set; and wherein elements can be added to the set, but not removed and wherein the more elements that are added to the set, the larger the probability of false positives.

7. The method of claim 1 wherein, the hashes of files comprise preimage resistant hash functions which are configured to enable the host computers to be equipped with a detection capability without revealing sensitive details about detection capability to the users thereof.

8. The method of claim 1 wherein the size h of the hashes generated by the filter hash algorithms is 20 bytes.

9. The method of claim 1 wherein the central computer compares the received generated corresponding filter for the suspect hash against the combined malware signature filter, and when a positive alert report is received from one of the host computers, the central computer subsequently sends the suspect hashes to at least another host computer in a new or updated combined malware signature filter.

10. The method of claim 1 wherein the bandwidth requirement of the combined malware signature file is (n*f) where f is a filter size in bytes.

11. The method of claim 1 wherein the network is a mobile ad hoc network and wherein existing malware signatures are used to create the combined malware signature filter; and wherein pre-image resistant hash functions in the Bloom filter construction are used to enhance privacy and security of digital signatures; and wherein a single combined Bloom malware filter is used for multiple independent signature sets; and wherein the combined Bloom malware filter is sparsified to add extra capacity and reduce update size; and wherein updates are distributed in peer-to-peer fashion without requiring a central server; and wherein the combined Bloom malware filter is combined with whitelisting.

12. The method of claim 1, wherein the central computer combines the filters for the malware signature using an OR operation on the bits of the combined filters to form the combined malware signature filter.

13. The method of claim 1, wherein a filter of a malware signature is generated by selecting a set of filter hash algorithms for the malware signature for the fixed false positive rate, hashing the malware signature using the selected set of filter hash algorithms, and maintaining a mapping of the hashes to the malware signature.

14. The method of claim 1, wherein the same filter hash algorithms used to generate the filters for the malware signatures that were combined to form the combined malware signature filter at the central computer are used to generate the corresponding filter for the hashes for the files and incoming data scanned at the host computer.

15. The method of claim 1, wherein there the combined malware signature filter is generated with a reserve capacity to permit updates without significantly affecting the false positive rate.

16. The method of claim 1, wherein the central computer further determines whether the filter for the suspect hash is in the combined malware signature filter, and if it is not, the central computer updates the combined malware signature filter with the filter for the suspect hash.

17. The method of claim 1, wherein that host computer generates a positive alert identification by updating the combined malware signature filter with the identified suspect hash.

18. The method of claim 1, further comprising applying a compression algorithm on the combined malware filter at the central computer before sending to the host computers and/or the broadcasting of the generated corresponding filter at the host computer before sending to the central computer.

19. An improved malware detection system in a distributed computer network system comprising a central computer and a plurality of host computers, the system comprising:
   a hardware processor comprising a signature generator within the central computer configured to:
      combine at least one filter for one malware signature with at least one filter for another malware signature to form a combined malware signature filter having a fixed false positive rate using filter hash algorithms; and
      send the combined malware signature filter from the central computer to the host computers;
   a hardware processor comprising a signature generator within each host computer configured to:
      scan files and incoming data using the combined malware signature filter,
      generate hashes for the files and incoming data scanned and corresponding filters using filter hash algorithms; and
      test the generated corresponding filters against the combined malware signature filter,
      when the combined malware signature filter identifies a suspect hash in a file or incoming data, the host computer that is performing the scanning returns a positive alert to the central computer using a signal generator,
      wherein there is a limitation of bandwidth requirement for the positive alert reporting of 0.7*b*h bytes, where b is number of bits per element in the combined malware signature filter and wherein size h in bytes of the hashes generated by the filter hash algorithms; and
   in response to receiving the positive alert report including the generated corresponding filter from one of the host computers, the central computer is further configured to broadcast the received generated corresponding filter for the suspect hash to at least another of the host computers,
   wherein there is a limitation of bandwidth requirement of broadcast of 0.7*b*h+1 bytes, with the one byte added to indicate an action to be taken corresponding to quarantine or releasing.

* * * * *